United States Patent [19]

Asami

[11] Patent Number: 4,850,773

[45] Date of Patent: Jul. 25, 1989

[54] CLIP

[75] Inventor: Goro Asami, Utsunomiya, Japan

[73] Assignee: Nifco, Inc., Yokohama, Japan

[21] Appl. No.: 198,795

[22] Filed: May 25, 1988

[30] Foreign Application Priority Data

May 27, 1987 [JP] Japan .................................. 62-80442

[51] Int. Cl.⁴ ............................................ F16B 37/00
[52] U.S. Cl. ..................................... 411/173; 24/297;
24/453; 411/107; 411/182; 411/340; 411/908
[58] Field of Search ............... 411/105, 107, 182, 337,
411/340, 342, 344, 345, 908, 970, 173;
24/289–292, 297, 453

[56] References Cited

U.S. PATENT DOCUMENTS

| | | | |
|---|---|---|---|
| 2,404,169 | 7/1946 | Gidden | 411/340 |
| 2,948,938 | 8/1960 | Holton | 24/289 |
| 4,122,583 | 10/1978 | Grittner et al. | 411/44 X |
| 4,499,636 | 2/1985 | Tanaka | 24/297 X |
| 4,517,710 | 5/1985 | Beckmann | 411/340 X |
| 4,698,882 | 10/1987 | Lang | 24/289 |

Primary Examiner—Gary L. Smith
Assistant Examiner—Douglas E. Ringel
Attorney, Agent, or Firm—Schwartz & Weinrieb

[57] ABSTRACT

A clip comprises a clip body having an enlarged diameter head portion at one end and a stud reception hole extending from the center of the other end toward the head portion. Integrally attached by means of hinge portions to the outer periphery of the clip body are outwardly extending locking portions and engagement seat portions integral with stem portions of the locking portions and extending away from the head portion. The locking portions are folded together with the engagement seat portions at the hinge portions so as to be locked to the head portion.

20 Claims, 4 Drawing Sheets

ID
CLIP

FIELD OF THE INVENTION

This invention relates to improvements in a clip used for mounting a plate upon a stud or the like which is secured by means of fusing or welding to a panel or the like and, more particularly, to improvements in such a clip, in which an engagement seat for supporting a mounted plate so as to prevent the plate from becoming disengaged from the stud is formed simultaneously with the stud fitting, thus effectively preventing the disengagement of the mounted plate from the stud.

BACKGROUND OF THE INVENTION

As a method of mounting a trim board or the like upon a motor vehicle panel, it has been common to weld studs to the panel and subsequently attach the trim board to the studs using clips.

In this method, it is necessary to weld studs one by one to the panel. Besides, if the studs are too long, the mounted trim board is liable to fall off. For this reason, it is necessary to separately provide means for preventing the disengagement of the board from the studs and panel. In accordance with this method, however, the dressing upon the weldment surface is liable to be roughened so as to cause rusting.

Accordingly, it has been proposed to form mounting holes within the panel and mount a trim board or the like using anchor-type clips by utilizing the mounting holes within the panel.

In accordance with such a mounting method, there is no need of welding studs one by one to the panel or mounting a fall-off prevention seat upon the welded studs, so that the mounting operation can be conducted speedily. Furthermore, there is no problem of roughening or rusting of the dressed surface of the mounting area.

Accordingly, recently a method as shown in FIGS. 12 and 13 has been tried. In accordance with this method, a stud 102 is robot-welded to a panel 101, a collar 104 is then disposed about the stud 102 in order to prevent disengagement of a plate 103, and in this state, the plate 103 is held such that its mounting hole 106 faces the free end of the stud 102. In this state, a clip 105 which has a female thread or inner ridges to be meshed with the free end of the stud 102 is engaged upon the stud so as to effect mounting of the plate 103.

In accordance with such method, it is necessary to prepare the collar 104 so as to have a length conforming to the length of the stud 102 and to position the collar 104 about the stud 102 before forcibly fitting the clip 105 upon the stud 102. Therefore, the mounting operation is cumbersome. Furthermore, two parts are required as a set, and it is necessary that the length of the collar 104 suitably conform to the length of the stud 102. Therefore, the cost of parts is comparatively high.

Still further, when the collar 104 is disposed about the stud 102 secured to the panel 101 and the plate 103 is mounted by forcibly fitting the clip 105 upon the stud as shown in FIG. 13, the edge portion of the plate 103 surrounding the hole 106 is liable to be deformed upwardly by means of the mounting force applied to the plate 103 in addition to the fact that the stud 102 projects together with the clip 105 upwardly from the hole 106 of the plate 103.

OBJECTS OF THE INVENTION

An object of the invention is to provide a clip which can reliably secure a plate to the free end of a stud without requiring any collar and irrespective of the length of the stud.

Another object of the invention is to provide a clip which can reliably hold a plate without the upward projection of a stud therethrough or the outward deformation of the plate when a force or load is applied to the plate.

SUMMARY OF THE INVENTION

To attain the above objects of the invention, there is provided a clip which comprises a clip body, a head portion, locking portions and engagement seat portions. The head portion is provided at one end of the clip body and has a diameter greater than a mounting hole provided within a plate to be mounted upon the stud. The clip body has a stud reception hole, which extends from the other end thereof toward the head portion, and into which a stud is inserted. The locking portions are united by means of hinge portions to diametrically opposed portions of the outer periphery of the clip body such that they extend outwardly. The engagement seat portions are integral with stem portions of the locking portions and extend away from the head portion. The locking portions and engagement seat portions are folded at the hinge portions toward the head portion so as to be detachably engaged with the head portion.

The clip having the above construction according to the invention is inserted by means of the engagement seat portions into a mounting hole defined within the plate to be mounted upon the stud in such a state that the stud reception hole faces the end of the stud.

As the clip is inserted into the hole, the free end of the stud is inserted into the stud reception hole of the clip, while the locking portions are brought into engagement with an inner peripheral edge portion of the plate surrounding the hole so as to be gradually folded toward the head portion. With the folding of the locking portions, the engagement seat portions are also gradually folded toward an undersurface portion of the plate.

When the locking portions are sufficiently folded, hook portions of the locking portions are engaged with locking projections of the head portion, so that the locking portions are locked to the head portion. Simultaneously, the engagement seat portions are folded so as to be substantially parallel to the plane of the plate. In this state, they form a rear or lower seat for preventing the disengagement of the plate from the stud and clip assembly.

In this state, the stud is sufficiently inserted within the stud reception hole of the clip body, and the stud, clip, and plate are held in a satisfactorily engaged relationship with respect to one another.

As noted above, the clip according to the invention is a one-piece member but nevertheless serves to secure a plate and prevent the disengagement thereof from the stud and the clip assembly. Besides, the plate can be readily mounted. Furthermore, the cost of manufacture and mounting can be reduced. Still further, the plate and stud are elastically coupled together by means of the clip which is made of a resin. Rattling of the mounting portion can therefore be eliminated. Moreover, it is possible to eliminate outward deformation of the plate even when an external force is applied thereto.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENT

Figure 1:
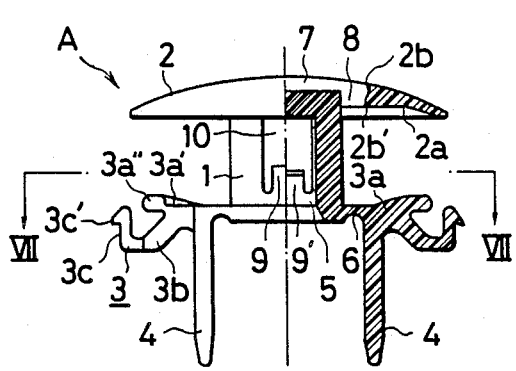
FIG 1 is a front view, partly in section, showing an embodiment of the clip according to the invention.
Figure 2:
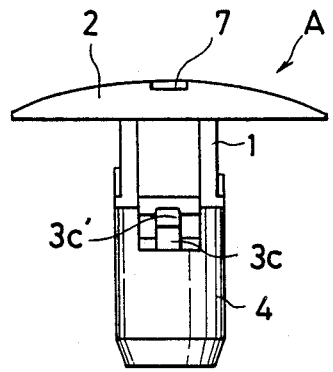
FIG. 2 is a side view showing the clip of FIG. 1.
Figure 3:
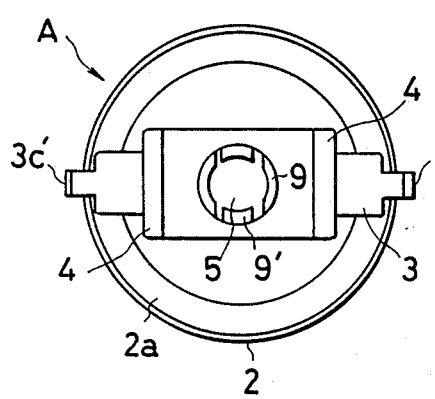
FIG. 3 is a bottom view showing the clip of FIG. 1.
Figure 4:
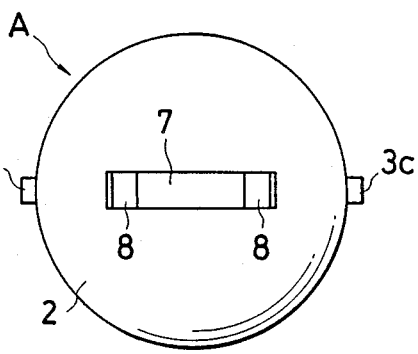
FIG. 4 is a plan view showing the clip of FIG. 1.

FIGS. 1 to 8 show one embodiment of the clip according to the invention. Referring to the Figures, symbol A designates a clip, symbol B designates a plate, such as, for example, a trim board, which is mounted upon the clip A, and symbol C designates a stud erected upon a panel or the like upon which the clip-board assembly is to be mounted.

The clip A is fabricated as a one-piece member by injection molding a resin having excellent elastic deformation properties. It has a clip body 1, formed as a cylindrical tube a head portion 2, locking portions 3 and engagement seat portions 4. The head portion 2 is provided at one end of the clip body 1. The locking portions 3 and engagement seat portions 4 are united by means of hinge portions 6 to the outer periphery of the other end of the clip body 1. The clip body 1 also has a stud reception hole 5, which extends from the center of the other end thereof toward the head portion 2, and in which a stud is to be inserted.

Figure 9:
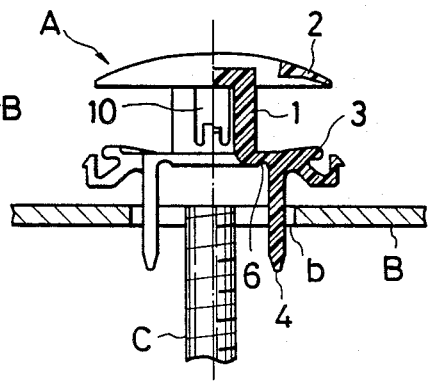
FIG. 9 is a front view, partly in section, showing a situation in which the clip according to the invention is inserted into a mounting hole of a plate.
Figure 10:
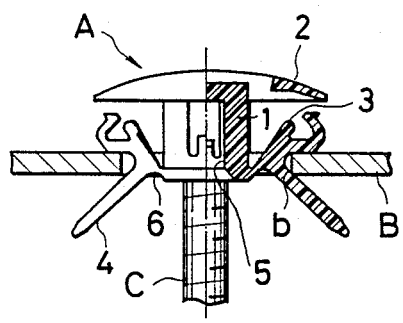
FIG. 10 is a front view, partly in section, showing a situation in which the clip locking portions are folded as a result of the insertion of the clip according to the invention into a mounting hole of the plate.

Now, the individual constituent parts will be described in detail. The head portion 2 of course has a diameter greater than the diameter of a hole b, which is formed within the plate B, and within which the clip A is mounted, as seen in FIG. 9. Usually, the head portion 2 has a comparatively flat, convex spherical shape so as to give it a good appearance. Its apex portion is formed with a groove 7 for receiving a screwdriver or similar tool for turning the clip A. Rectangular locking holes 8 communicate the opposite ends of the groove 7 with the lower surface of the head portion 2. The lower surface of the head portion 2 has a recessed portion 2a. Each hole 8 is defined by means of a side surface 2b which is inclined with respect to the axis of the head portion 2. This surface 2b and recessed portion 2a form a locking engagement projection or hook 2b' which is adapted to engage with the locking portions 3 as will be described later in detail.

Figure 6:
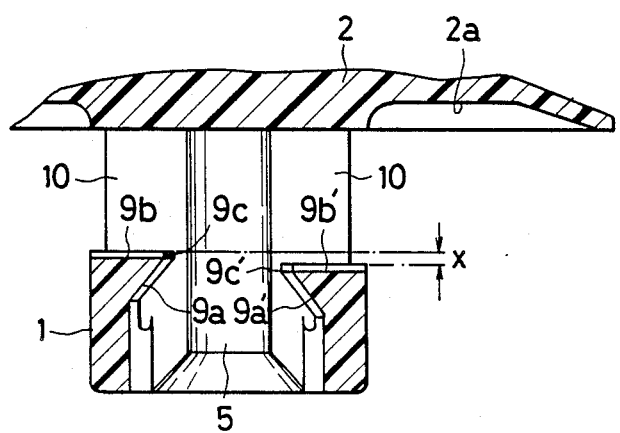
FIG. 6 is a fragmentary enlarged-scale sectional view showing the clip body of the clip shown in FIG. 1.
Figure 7:
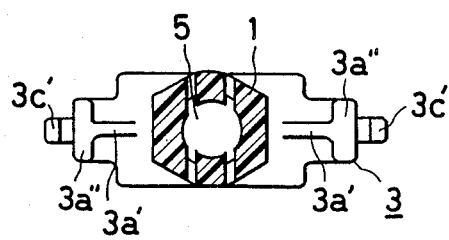
FIG. 7 is a sectional view taken along line VII—VII in FIG. 1.

The stud reception hole 5 which is formed along the axial centerline of the clip body 1 is provided with a pair of diametrically opposed engagement portions 9 and 9' which can be outwardly elastically deformed by means of the stud C when the latter is inserted into the hole 5 so as to lock the stud C at its inserted position. The engagement portions have respective arcuate engagement projections 9c, 9c' which are disposed in a staggered fashion with respect to each other. The engagement portions 9 and 9' are formed for the purpose of reliably causing elastic deformation and also from the consideration of mold separation. They are formed by forming the periphery of the clip body 1 with windows 10 at predetermined circumferential sections communicating with the stud reception hole 5 such that they are separated from the clip body 1 by means of the windows 10. The engagement portions 9 and 9' have inclined surfaces 9a and 9a' as best seen in FIG. 6, which are inclined toward the axis of the stud reception hole 5 as one goes from the inlet of the hole to the depth thereof, and horizontal surfaces 9b and 9b' defined by means of the windows 10. The surfaces 9a, 9a' and 9b, 9b' form the aforementioned engagement projections 9c and 9c'.

The engagement projections 9c and 9c' are staggered in the vertical direction by means of a distance x (FIG. 6) corresponding to the thread pitch of the stud C with which the projections 9c and 9c' will be engaged.

Figure 8:
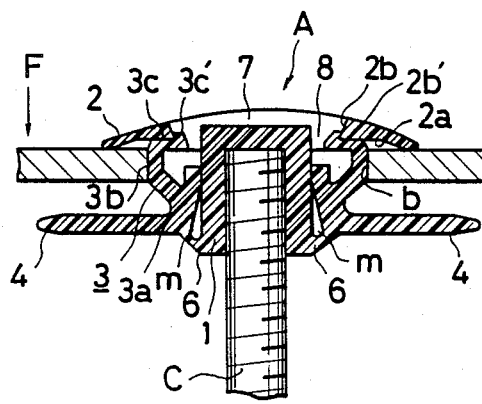
FIG. 8 is a sectional view showing a structure in which a plate is secured to an end portion of the stud by means of the clip shown in FIG. 1.

The locking portions 3 and engagement seat portions 4 are united by means of the hinge portions 6 to the outer periphery of the end portion of the clip body 1 disposed opposite the head portion 2. They are provided on the side without the window 10 so that the locking portions 3 are brought into contact with the outer periphery of the clip body 1. More specifically, the pair of locking portions 3 and engagement seat portions 4 are provided symmetrically upon opposite sides of the clip body 1 so as to sandwich the windows 10 therebetween. The hinges 6 each have a reduced thickness portion 6a closer to the clip body 1 than to the associated locking portion 3 so that the locking portions 3 can be folded easily and so that a gap m is produced with respect to the clip body 1 (FIG.8).

Figure 5:
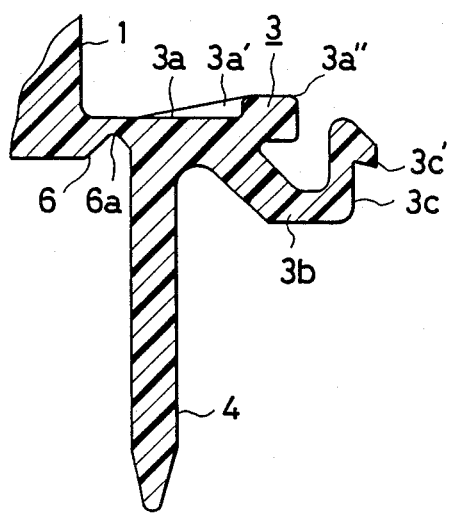
FIG. 5 is a fragmentary enlarged-scale sectional view showing a locking portion and an engagement seat portion of the clip shown in FIG. 1.

The locking portions 3, as shown in FIG. 5, each have a plate-like portion 3a extending laterally outwardly and a tongue portion 3b branching outwardly from the plate-like portion 3a and extending downwardly and then horizontally. The free end of the tongue portion 3b is provided with an integral hook portion 3c extending upwardly so as to be perpendicular to the horizontal portion of tongue 3b and having a locking hook 3c'. The hook portion 3c is disposed outwardly of the plate-like portion 3a. The plate-like portion 3a has an outward projection 3a' having a top surface inclined upwardly from the stem to the free end portion thereof, and the free end of the plate-like portion 3a is also provided with an engagement projection 3a" which is, in effect, a continuum of the projection 3a'.

The engagement seat portion 4 is integral with the associated locking portion 3 and depends from the stem thereof. It extends substantially parallel to the outer periphery of the clip body 1.

Figure 11:
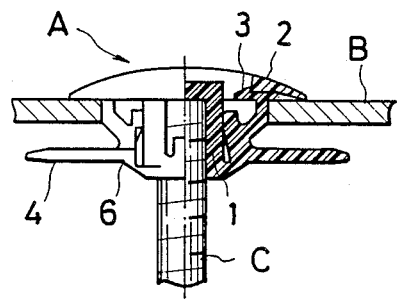
FIG. 11 is a front view, partly in section, showing a situation in which the plate is secured to a stud by means of the clip according to the invention.
Figure 12:
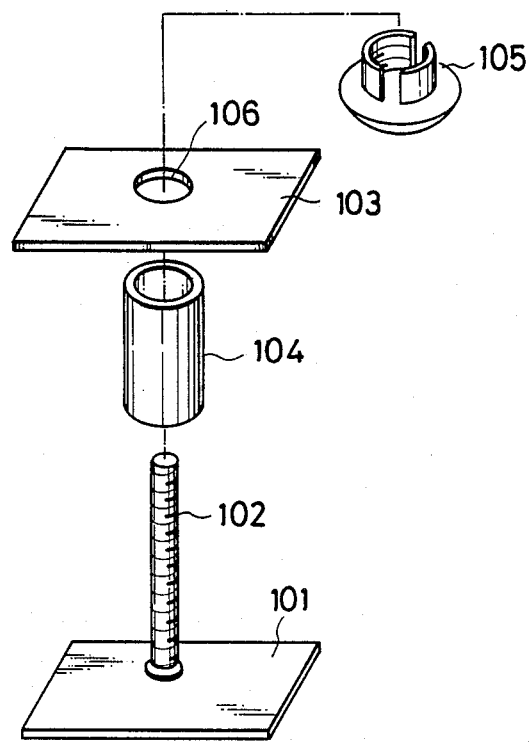
FIG. 12 is an exploded perspective view showing a prior art clip.
Figure 13:
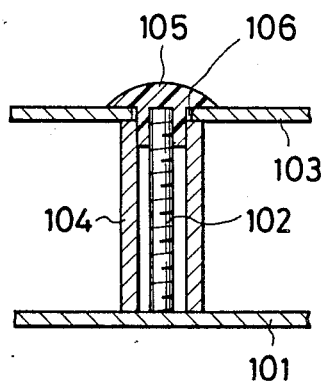
FIG. 13 is a sectional view showing the prior art clip of FIG. 12 in the state of use.

Now, the method of securing a plate to the end of a stud using the clip having the above structure will be described with reference to FIGS. 9 and 11.

First, a plate B to be mounted is held such that the free end of a stud C welded to a panel (not shown) faces the hole b defined within the plate B.

In this state, the clip A is inserted by means of the engagement seat portions 4 into the hole b. As a result, the stud C is inserted within the stud reception hole 5 of the clip body 1, and also the tongue portion 3b of each locking portion 3 is brought into engagement with the upper surface of the plate B so as to cause elastic deformation of the hinge portion 6, so that the locking portion 3 is gradually folded toward the head portion 2.

As the clip A is further inserted into the hole b of the plate B, the hook portion 3c of the locking portion 3 slides over the surface of the depressed portion 2a of the head portion 2, and the hook 3c' is eventually brought into engagement with the engagement projection 2b' extending from the side surface 2b and into the hole 8. Also, the tongue portion 3b and plate-like portion 3a of the locking portion 3 elastically engage the outer periphery of the clip body 1 and the interior wall surface of the hole b so as to retain the plate B, and also the hook 3c' is urged against the engagement projection 2b'.

Each engagement seat portion 4, which is erected with the folding of the associated locking portion 3, is rendered substantially parallel to the underside of the plate B, so that disengagement of the plate B is effectively prevented.

As has been described above, the clip according to the invention has a feature that the engagement seat portion for preventing the disengagement of the mounted plate is formed by merely fitting the clip upon a stud independently of the length thereof. It also has a feature that the mounted plate is elastically supported by means of the tongue portion and plate-like portion of each locking portion so that no rattling will occur within the mounting area. Furthermore, when an external force is applied to the mounted plate B in the direction of arrow F (in FIG. 8), the plate B is supported by means of the engagement seat portions 4 and is prevented from being disengaged from the clip and stud. When the load supported by means of the engagement seat portions 4 is increased, the engagement between the hook 3c' and engagement projection 2b' is reinforced, so that disengagement of the mounted plate B can be reliably prevented.

Furthermore, since the mounted plate B is supported by means of the engagement seat portions 4 having a planar area, unlike the case of the prior art, the edge portion of the plate B surrounding the hole b will not be broken or deformed even when a great force is applied to the mounted plate B in the direction F.

What is claimed is:

1. A clip for securing a plate to a free end of a stud and for holding said plate upon said stud, comprising:
   a clip body;
   a head portion, having a diameter greater than that of said clip body, mounted at one end portion of said clip body, and having first locking means defined thereon;
   a stud reception hole extending from the center of the other end portion of said clip body toward said head portion of said clip body;
   a pair of locking portions extending outwardly from the outer periphery of said other end portion of said clip body and having second locking means defined thereon for cooperating with said first locking means of said head portion of said clip body; and
   hinge means interposed between said locking portions and said other end portion of said clip body for permitting said locking portions to be folded toward said head portion so as to enable said second locking means of said locking portions to be engaged with said first locking means of said head portion of said clip body when said stud reception hole of said clip body is fitted upon said stud as said clip is disposed within a mounting hole formed within said plate.

2. A clip as set forth in claim 1, wherein:
   said stud has a threaded portion defined thereon.

3. The clip according to claim 2, wherein an inner peripheral wall section of said stud reception hole of said clip body has engagement projections to be meshed with said threaded portion of said stud.

4. A clip as set forth in claim 3, wherein:
   said engagement projections of said clip body are staggered with respect to each other in vertically spaced, horizontal planes corresponding to the thread pitch of said threaded portion of said stud.

5. A clip as set forth in claim 3, wherein:
   said engagement projections comprise radially inwardly extending projections defined upon said inner peripheral wall section of said clip body defining said stud reception hole.

6. A clip as set forth in claim 3, wherein:
   said engagement projections are diametrically opposed with respect to each other.

7. A clip as set forth in claim 3, further comprising:
   window means defined within predetermined circumferential sections of said clip body and having a predetermined axial length along said clip body such that said engagement projections are formed within a remaining portion of the axial length of said clip body within said predetermined circumferential sections of said clip body.

8. The clip according to claim 1, wherein said head portion has a substantially spherical shape.

9. The clip according to claim 8, wherein said first locking means consists of locking holes formed within said substantially spherical head portion upon opposite sides of an apex portion thereof and defining, with a lower surface portion of said head portion, said first locking means.

10. A clip as set forth in claim 9, wherein:
    said first locking means of said head portion of said clip body comprises first hook means as defined by inner wall portions of said locking holes and said lower surface of said head portion; and
    said second locking means of said locking portions comprises second hook means.

11. A clip as set forth in claim 1, wherein:
    said first locking means of said head portion of said clip body comprises first hook means; and
    said second locking means of said locking portions comprises second hook means.

12. A clip as set forth in claim 1, wherein:
    said clip body has the configuration of a cylindrical tube.

13. A clip as set forth in claim 1, further comprising:

engagement seat portions integrally formed with said locking portions for supporting said plate upon said clip body when said clip body is mounted upon said stud.

14. A clip set forth in claim 13, wherein:
said engagement seat portions and said locking portions are disposed substantially perpendicular with respect to each other.

15. A clip as set forth in claim 14, wherein:
said locking portions are disposed substantially radially outwardly from said clip body, and said engagement seat portions are disposed substantially axially with respect to a longitudinal axis of said clip body, prior to said folded movement of said locking portions toward said head portion, and said locking portions are disposed substantially axially with respect to said longitudinal axis of said clip body, and said engagement seat portions are disposed substantially radially outwardly with respect to said longitudinal axis of said clip body, when said second locking means of said locking portions are engaged with said first locking means of said head portion of said clip body.

16. A clip as set forth in claim 13, wherein:
said head portion, said clip body, said locking portions, and said engagement seat portions comprise a single-piece component.

17. A clip as set forth in claim 16, wherein:
said single-piece component is fabricated from synthetic resin material.

18. A clip as set forth in claim 1, wherein:
said head portion, said clip body, and said locking portions comprise a single-piece component.

19. A clip as set forth in claim 18, wherein:
said component is fabricated from synthetic resin material.

20. A clip as set forth in claim 1, further comprising:
slot means formed within said head portion of said clip for accommodating a manipulative tool for rotating said clip relative to said stud.

* * * * *